Figure 1:
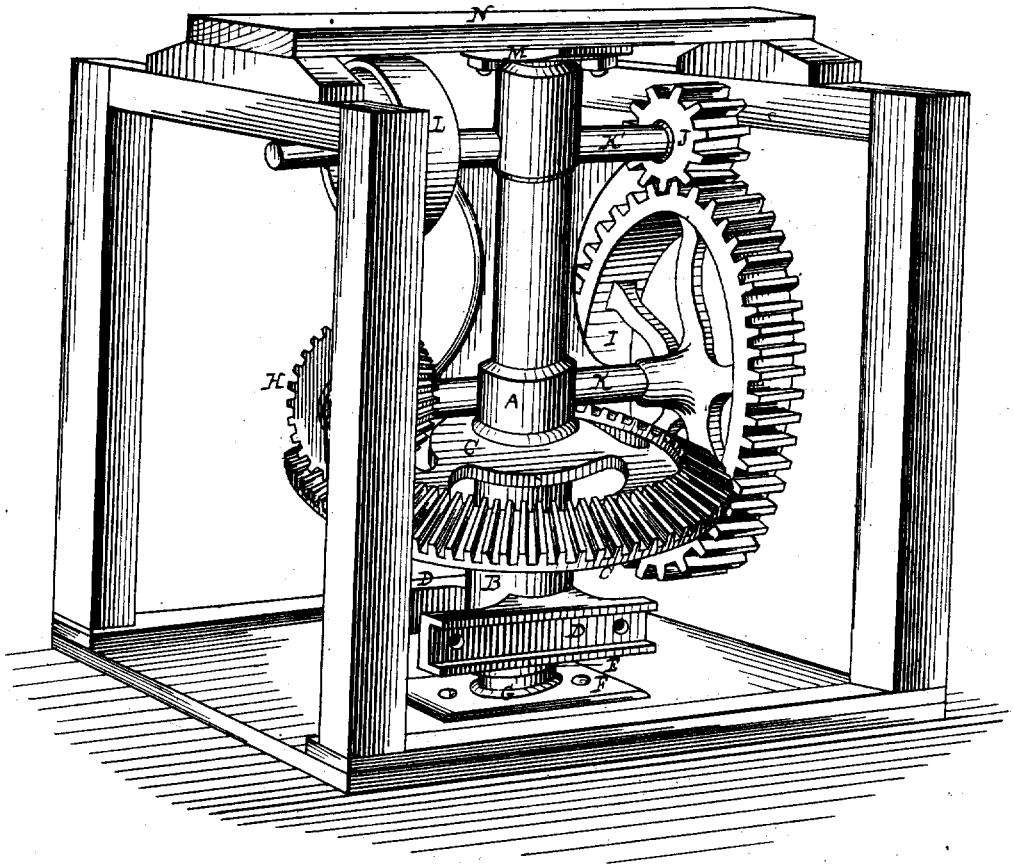

2 Sheets—Sheet 1.

W. DEERING.

HORSE-POWER.

No. 7,012.

Reissued March 28, 1876.

*Witnesses:*
J. E. Boggs.
Claudius L. Parker

*Inventor:*
William Deering,
by George H. Christy
Atty for him and
his Assignees.

N. PETERS, PHOTO-LITHOGRAPHER, WASHINGTON, D. C.

2 Sheets—Sheet 2.

W. DEERING.

HORSE-POWER.

No. 7,012. Reissued March 28, 1876.

*Witnesses:*
J. E. Boggs.
Claudius Starker

*Inventor:*
William Deering,
by George N. Christy
Atty for him and
his Assignees.

N. PETERS, PHOTO-LITHOGRAPHER, WASHINGTON, D. C.

UNITED STATES PATENT OFFICE.

WILLIAM DEERING, OF LOUISVILLE, KENTUCKY.

IMPROVEMENT IN HORSE-POWERS.

Specification forming part of Letters Patent No. 121,932, dated December 19, 1871; reissue No. 7,012, dated March 28, 1876; application filed February 16, 1876.

*To all whom it may concern:*

Be it known that I, WILLIAM DEERING, of the city of Louisville, county of Jefferson and State of Kentucky, have invented certain new and useful Improvements in Horse-Engines, with horizontal first-movers or master-wheels, of which the following is a specification:

Horse-engines with horizontal first-movers are of two classes—first, that in which these wheels are secured to central axles, which turn with the wheels; and, second, that in which the wheels revolve around central pivots or spindles which are stationary.

My improvement is confined to this second class; and consists in projecting this central spindle (somewhat enlarged) through the master-wheel, and providing it with transverse bearings for the support of one or more counter-shafts; and, second, in adding to the central spindle of the master-wheel the character of a column by continuing it up as a pillar for the support of a workshop, barn, or gin-house.

My engine, as shown in the drawing, contains both of these improvements. As represented, its master-wheel turns on the lower part of a stationary iron pillar, which, at its upper end, by a flanged horizontal table or cap, receives and supports a transverse beam of a house or frame-work, and which has side projections cast solidly with itself for the support of two counter-shafts. That part of the pillar which serves as a spindle for the revolution of the master-wheel is turned accurately in the lathe. The master-wheel has a long hub, which is bored to fit the pillar, and which terminates at its lower end in a flange, which is faced in the lathe at right angles to its bore. This flange rests on the upper and polished surface of a large collar, which is fastened on the pillar near its lower end with strong set-screws for the under or foundation support of the master-wheel. The lower part of this hub has two, though it may have but one, or more projecting flanges, on which to bolt the levers for the attachment of the horses. A first counter-shaft passes through the pillar about five inches above and at right angles to the vertical axis of the master-wheel, while a second passes through it parallel with the first and at a point about twenty-four inches above it. Both these shafts are supported by branches or bearings projecting from opposite sides of the pillar, and these branches are made sufficiently large to be bored through their outer ends for the journal-boxes. The master-wheel drives a pinion, which is keyed on the first shaft. On the other end of this shaft is a gear-wheel, which meshes into and drives a pinion keyed on the corresponding end of the upper shaft, and on the opposite end of this latter is keyed a band-pulley for the further transmission of the power, as may be required. In my machine, as thus constructed, each of these pinions is one-quarter the size of its driver, which causes the band-pulley to revolve sixteen times for one time of the master-wheel and horses. The proportions, however, may be varied as required, or the band-pulley may be keyed on the end opposite the pinion on the first shaft, and the upper shaft dispensed with; or a third shaft may be projected through the pillar, and the mill-work continued from the second to drive a still faster revolving band-pulley on this third, as any exigency may demand.

The objects of my invention are first to make a simple and steadfast support for the counter-shaft or shafts of a horse-engine by homogeneously continuing the stationary spindle of its master-wheel up into a body of the proper form and size for that support; and, second, to make a support for a house or frame-work by continuing the stationary spindle of the revolving master-wheel up into a pillar for such support, and thus, through its double character of a spindle and a pillar, to carry the master-wheel and supply a support for a house or frame-work at a point at which, with engines of the first class, any such support is impractical, any greater or less number of shafts, or any desired variation in the height or volume of the pillar is possible, without any injurious interference with the main objects as I have secured them, as set forth.

Figure 2:
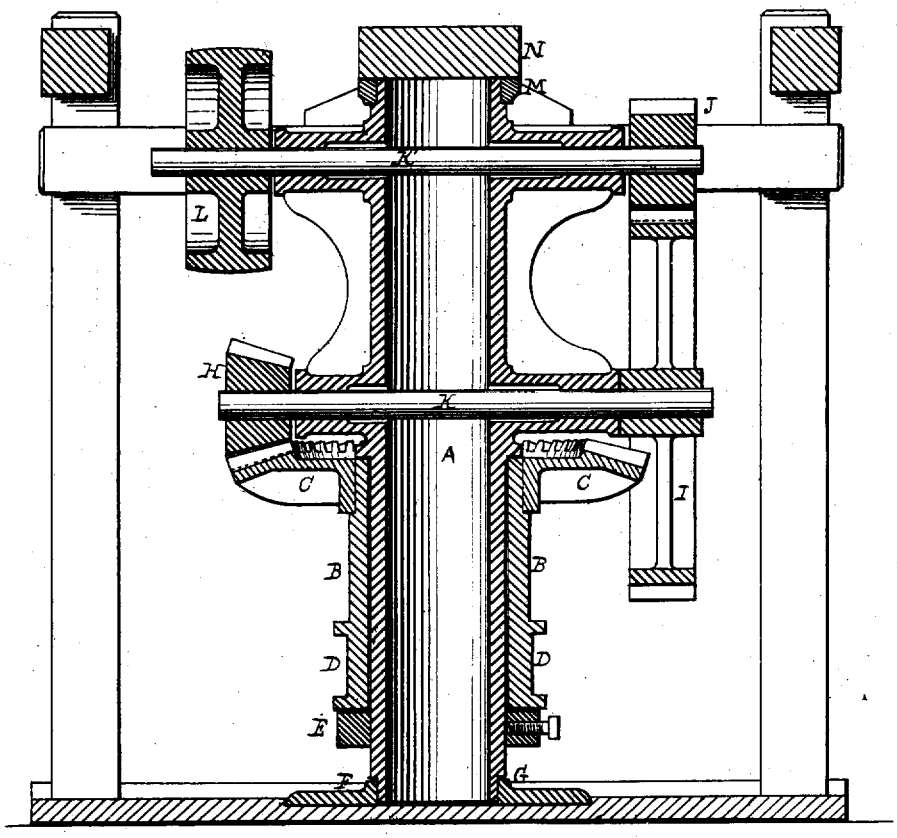

In the annexed drawing, Figure 1 is a perspective view of the machine, with a part of the frame left out, in order to give a more perfect view of it. Fig. 2 is a sectional view of it, and shows the interior of the spindle of the master-wheel in its primary character as simply that spindle; in its second character as continued up into side branches for the support of the counter-shafts; and in its third character as continued up as a pillar for the support of a beam or house, as described.

In the drawing, A is the central part of the machine, constituting the stationary spindle of the master-wheel, the support of the counter-shafts, and the pillar, as described. B is the long hub of the master-wheel. C is the master-wheel. D are the projections on the hub to which to bolt the levers for attachment of the horses. E is the collar secured to the spindle for the under bearing of the master-wheel. F is a socket-plate, through which the lower end of the spindle passes to a foundation-block. G is a flange on the socket-plate. H is the pinion worked by the master-wheel. K is the first or lower counter-shaft, on which the pinion H is keyed. I is the gear-wheel keyed on the other end of the shaft K. J is the pinion driven by the gear-wheel I. K′ is the upper or second shaft, on which is keyed the pinion J. L is the band-pulley keyed on the other end of the shaft K′. M is the flanged horizontal table on top of the pillar, and N is the central beam which it supports.

Having thus fully described my invention, what I claim as new, and desire to secure by Letters Patent, is—

1. The stationary spindle of the revolving master-wheel, projecting through the master-wheel, and having transverse bearings for the support of one or more counter-shafts, substantially as set forth.

2. The stationary spindle of the revolving master-wheel, projected through the master-wheel, and at its upper end receiving and supporting a transverse beam of a house or framework, substantially as set forth.

WILLIAM DEERING.

Witnesses:

JAS. A. BURRETT,
F. N. HAMMETT.